United States Patent
Hockley et al.

(10) Patent No.: US 10,740,510 B2
(45) Date of Patent: Aug. 11, 2020

(54) METHOD OF ADDITIVE MANUFACTURING AND COMPUTER READABLE MEDIUM

(71) Applicant: Siemens Aktiengesellschaft, Munich (DE)

(72) Inventors: Carl Hockley, Worcester (GB); Simon Purschke, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/321,213

(22) PCT Filed: Aug. 2, 2017

(86) PCT No.: PCT/EP2017/069550
§ 371 (c)(1),
(2) Date: Jan. 28, 2019

(87) PCT Pub. No.: WO2018/029058
PCT Pub. Date: Feb. 15, 2018

(65) Prior Publication Data
US 2019/0171781 A1     Jun. 6, 2019

(30) Foreign Application Priority Data
Aug. 9, 2016 (EP) .................... 16183352

(51) Int. Cl.
*G06F 30/20* (2020.01)
*B22F 3/105* (2006.01)
(Continued)

(52) U.S. Cl.
CPC ............ *G06F 30/20* (2020.01); *B22F 3/1055* (2013.01); *B22F 5/04* (2013.01); *B22F 7/062* (2013.01);
(Continued)

(58) Field of Classification Search
CPC ....... B28B 17/0081; B22F 5/04; C04B 35/64; G06F 30/20
See application file for complete search history.

(56) References Cited

U.S. PATENT DOCUMENTS

2015/0224743 A1* 8/2015 Schick .................. B22F 3/1055
428/615
2016/0175934 A1* 6/2016 Lacy .................... B23K 26/342
428/172

(Continued)

FOREIGN PATENT DOCUMENTS

| EP | 2601006 A1 | 6/2013 |
|---|---|---|
| EP | 2905097 A2 | 8/2015 |

OTHER PUBLICATIONS

PCT International Search Report and Written Opinion of International Searching Authority dated Oct. 17, 2017 corresponding to PCT International Application No. PCT/EP2017/069550 filed Aug. 2, 2017.

(Continued)

*Primary Examiner* — Vincent H Tran
(74) *Attorney, Agent, or Firm* — Beusse Wolter Sanks & Maire

(57) ABSTRACT

A method of additive manufacturing includes additively manufacturing a first section for a component, wherein the first section is provided with a position feature, additively manufacturing a second section for the component on the first section, and, in case that a build failure occurs during the additive manufacture of the second section, machining back a present buildup until the position feature is revealed, additively manufacturing the second section separately from the first section, thereby providing the second section with a corresponding position feature, and connecting the first section and the second section to provide the component.

15 Claims, 3 Drawing Sheets

(51) Int. Cl.

| | | |
|---|---|---|
| *B22F 7/06* | (2006.01) | |
| *B22F 5/04* | (2006.01) | |
| *B28B 17/00* | (2006.01) | |
| *C04B 35/64* | (2006.01) | |
| *B23P 6/00* | (2006.01) | |
| *B22F 5/10* | (2006.01) | |
| *B22F 5/00* | (2006.01) | |
| *B23P 15/02* | (2006.01) | |
| *G06F 119/18* | (2020.01) | |
| *B33Y 10/00* | (2015.01) | |
| *B33Y 50/02* | (2015.01) | |

(52) U.S. Cl.
CPC .......... *B28B 17/0081* (2013.01); *C04B 35/64* (2013.01); *B22F 5/10* (2013.01); *B22F 2003/1057* (2013.01); *B22F 2005/005* (2013.01); *B22F 2007/068* (2013.01); *B23P 6/002* (2013.01); *B23P 15/02* (2013.01); *B33Y 10/00* (2014.12); *B33Y 50/02* (2014.12); *G06F 2119/18* (2020.01); *Y02P 10/295* (2015.11)

(56) References Cited

U.S. PATENT DOCUMENTS

| | | | |
|---|---|---|---|
| 2017/0008126 A1* | 1/2017 | Long | B22F 3/1055 |
| 2017/0246683 A1* | 8/2017 | Jones | B29C 64/153 |

OTHER PUBLICATIONS

EP search report dated Jun. 2, 2017 for corresponding EP patent application No. 16183352.0.

* cited by examiner

METHOD OF ADDITIVE MANUFACTURING AND COMPUTER READABLE MEDIUM

CROSS REFERENCE TO RELATED APPLICATIONS

This application is the US National Stage of International Application No. PCT/EP2017/069550 filed Aug. 2, 2017, and claims the benefit thereof. The International Application claims the benefit of European Application No. EP16183352 filed Aug. 9, 2016. All of the applications are incorporated by reference herein in their entirety.

FIELD OF INVENTION

The present invention relates to a method of additive manufacturing, particularly a method preventing or eluding a system failure in the field of additive manufacturing. More particularly, the present invention may relate to a referencing concept.

BACKGROUND OF INVENTION

Powder bed manufacturing methods such as selective laser melting or selective laser sintering are relatively well known methods for fabricating, prototyping or manufacturing parts or components from powder material, for instance. Conventional apparatuses or setups for such methods usually comprise a manufacturing or build platform on which the component is built layer-by-layer after the feeding of a layer of base material which may then be melted, e.g. by the energy of a laser beam and subsequently solidified. The layer thickness is determined by a wiper that moves, e.g. automatically, over the powder bed and removes excess material. Typical layer thicknesses amount to 20 μm or 40 μm. During the manufacture, said laser beam scans over the surface and melts the powder on selected areas which may be predetermined by a CAD-file according to the geometry of the component to be manufactured.

A method of selective laser melting is known from EP 2 601 006 B1, for example.

The term "component" as used herein, advantageously pertains to a ceramic or metallic component. More advantageously, the components may pertain to components of a turbine, such as a gas turbine.

In the additive manufacture of large parts of components, e.g. by selective laser melting or electron beam melting, there is a large risk of wasted resources and/or built failure due to long associated build times. Particularly, if the build job fails in the middle of the buildup or when the build job is manufactured e.g. halfway, the part is normally wasted and a new manufacturing process has to be started from the beginning. This results in wasted time, raw material, and money.

It seems that there is no actual solution to the mentioned problems, wherein a build job, once it has catastrophically failed, i.e. the build cannot be recovered from within the machine environment, can be recovered and/or continued. Instead, the build job of the wrongly or falsely manufactured component has to be cancelled and the corresponding structure is wasted or scrapped.

SUMMARY OF INVENTION

It is, thus, an object of the present invention to provide means solving the mentioned problems. Particularly, a method is provided by means of which additive manufacturing systems or methods can be rendered fail-safe and/or a waste of material or components can be avoided. Particularly, instead, a build up failure at least in sections of the component can be "healed" and the original buildup can be adapted or continued.

The mentioned object is achieved by the subject-matters of the independent claims. Advantageous embodiments are subject-matter of the dependent claims.

An aspect of the present invention relates to a method of additive manufacturing of the part a component comprising additively manufacturing a first section for the component, wherein the first section is provided with a position feature.

The position feature may pertain to or be a reference or alignment feature.

The method further comprises additively manufacturing a second section for the component, e.g. advantageously on top of the first section. To this effect, the second section is advantageously adhesively, metallurgically and/or permanently connected to the first section.

In case that a build failure occurs, advantageously during the additive manufacture of the second section, the method comprises machining back a present buildup, expediently the buildup formed of the first section and the already solidified part of the second section, until the position feature is revealed a visible.

Said "back machining" may relate to any abrasive machining technique known to a skilled person. Preferably the back machining relates to melting and/or evaporating or a blade team away the already solidified material by the respective additive manufacturing techniques.

Expediently, the position feature or a plurality of position features shall be provided at expedient positions, e.g. sites of the component onto which a fairly complex geometry being prone to a build-failure or erroneous buildup, shall be manufactured.

After the position feature has been revealed, the method comprises additively manufacturing the second section in a second buildup or separately from the first section, thereby providing the second section with corresponding position feature.

The corresponding position features advantageously fit or match to the position features. The corresponding position features may further constitute position features which are complementary to the mentioned position features.

The method further comprises connecting the first section and the second section to provide for the component.

The first section may be a base section. The second section may instead be a section to be manufactured on top of the base section, such as a functional section of the respective component.

As an advantage of the presented method, a complete waste of resources in the case of build job failure may expediently be avoided in that the presented position feature(s) and the corresponding position feature(s) are provided directly by means of the additive manufacturing method. When e.g. an unwanted build failure occurs in the manufacture of the second section which is more prone to the mentioned build errors, e.g. the position features of the first section provide for an indication during the back machining indicating how far the first component has to be machined back.

Consequently, the buildup of the component may be recovered or continued based on the first section. Thus, time and resources already spent for the first section are not wasted and can be still used for the component. Another advantage of the presented method is that, the position features may easily be provided by means of the used additive manufacturing techniques. To this effect, the position features may already be contemplated in the respective dataset (CAD data) in the construction a setup of the component.

In an embodiment, the position feature and the corresponding position feature are engageable by a form-fit or positive fit. As an advantage of this embodiment, a mutual movement of the first and the second section, e.g. prior to the connection of said sections, can be avoided at least with respect to certain directions.

In an embodiment, the position feature comprises or constitutes a recess.

In an embodiment, the corresponding position feature is an engagement or locking feature or protrusion matching to the recess or vice versa, such that the first section and the second section are engageable or engaged.

In an embodiment, the first section is an easy-to-build or low-risk section of the component with a low manufacturing complexity. According to this embodiment, the first section is advantageously either a priori or chosen to be a section of the component which can be additively manufactured very reliably and is not prone to build errors.

In an embodiment the second section is a complex or high-risk section of the component which is or may e.g. be prone to manufacturing or build-up failure. In particular, the second section may constitute a section of the component comprising cavities, channels or other complex features. Further, the second section may comprise overhangs.

Said structures or geometries are—though being indeed manufacturable by additive means—prone to build errors, although additive techniques may in general be capable of manufacturing the respective designs.

In an embodiment, the position feature and the corresponding position feature are designed and/or manufactured such that the first section and the second section are aligned with respect to each other for connecting the first section and the second section.

In an embodiment—in case that the mentioned build error or build failure had occurred—the first section and the second section are finally adhesively, metallurgically and/or permanently connected with respect to each other. This may be carried out by means of welding, brazing and/or the application of glue.

In an embodiment, the first section comprises or constitutes a base section of or for the component, wherein a plurality of position features are provided at an upper boundary of the first section. An upper boundary of the first section may as well be defined by the position features.

In an embodiment, the plurality of position features are provided at the same height of the first section, e.g. measured or observed in a direction along a buildup axis of the component. Said buildup axis may inherently be defined by the respective additive manufacturing technique. E.g. in case of powder bed based techniques, the buildup axis is predefined as an axis in which a build platform has to be moved layerwise.

In an embodiment, a corresponding position feature of the second section is provided for each position feature of the first section. This embodiment is e.g. advantageous in terms of an expedient alignment of the first and the second section and/or a mutual fixation of the first and the second section least with respect to certain direction.

In an embodiment, the first and/or the second section are additively manufactured by means of a powder bed manufacturing technique, such as selective laser melting or electron beam melting.

In an embodiment the method is implemented or implementable in a CAD, CAM and/or simulation software, which is set up to design and/or calculate the position feature and its position in or at the component, e.g. automatically or semi-automatically, e.g. with the guidance of an operator.

A further aspect of the present invention relates to a computer readable medium comprising executable program instructions which are suitable to instruct a data processing device and/or an additive manufacturing device to execute at least some or all of the following steps:—additively manufacturing a first section for a component, wherein the first section (1) is provided with a position feature (10),—additively manufacturing a second section for the component on the first section (1), and, in case that a build failure occurs during the additive manufacture of the second section (2),—machining back a present buildup until the position feature (10) is revealed, and—additively manufacturing the second section separately from the first section, thereby providing the second section (2) with a corresponding position feature (20).

The steps of additively manufacturing advantageously pertain to the first section and the second section as described.

A further aspect of the present invention relates to a component manufactured or being manufactured by the mentioned method.

Advantages, features or embodiments relating to the described method may as well pertain to the component and/or the computer readable medium.

Further features, expediencies and advantageous refinements become apparent from the following description of the exemplary embodiment in connection with the Figures.

DETAILED DESCRIPTION OF INVENTION

Figure 1:
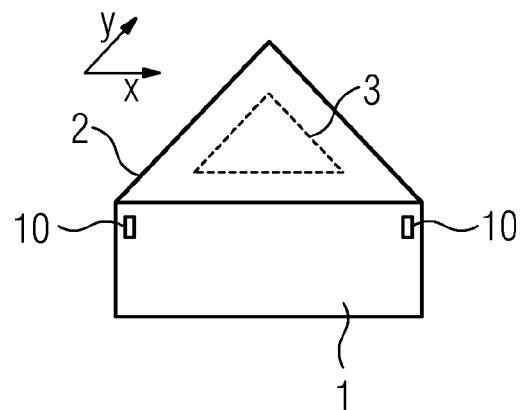
FIG. 1 indicates schematically a design of a component to be additively manufactured.

Like elements, elements of the same kind and identically acting elements may be provided with the same reference numerals in the Figures.

FIG. 1 shows, in a simplified schematic, a component 100, more particularly advantageously a dataset for said component, such as CAM- and/or a CAD-file.

The component 100 may be any component which can be manufactured by additive means, e.g. by selective laser melting or other techniques. Although this is not explicitly indicated, the component 100 may constitute a turbine component, such as blade or vane for a gas turbine. Alternatively, the component may be any other component applied in the field of fluid flow engine or further remote technical fields.

It is shown, that the component comprises a first section 1. The first section 1 may be a base section of or for the component 100.

The component further comprises a second section 2. The second section 2 may be an additional and/or a functional section of or for the component 100.

In case of turbine components, such as a blades or vanes, the first section may relate to a vane root and the second section may relate to the corresponding airfoil of said vane or blade.

In case of e.g. burner components for combustion or turbine engines, the first section may denote a burner base or root, wherein the second section may constitute a sophisticated or complex burner tip, for example.

For the present invention it is generally advantageous, that the first section 1 comprises a comparable simple or easy-to-build geometry. On the contrary, the second section is advantageously characterized by a fairly complex geometry which may be prone or susceptible to manufacturing failure.

The second section 2 is advantageously to be additively manufactured on or on top of the first section 1.

The differentiation between the first section 1 and the second section 2 may be defined by an operator of the manufacturing device or a corresponding computer-aided device or method or a software implementation.

The first section 1 may further be an easy-to-build or low-risk section of the component 100 with a low manufacturing complexity, wherein the second section 2 may be a complex or high-risk section of the component 100.

It is shown in FIG. 1, that the first section comprises position features 10, advantageously at lateral or contour sides of the component 100. Said position features 10 may e.g. be provided at every corner of the first section 1, i.e. four or even more position features 10 may be provided, e.g. along a circumference or close to an outer boundary of the component 100. The position features 10 may be equally spaced, e.g. close to the mentioned outer boundary.

Figure 2:
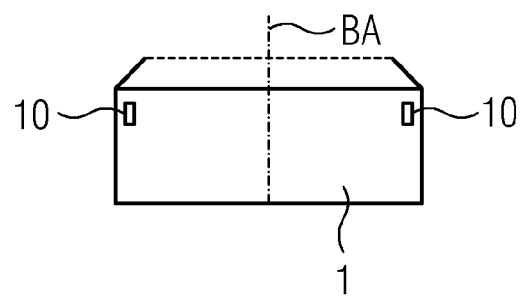
FIG. 2 indicates schematically a process step of the presented method.
Figure 6:
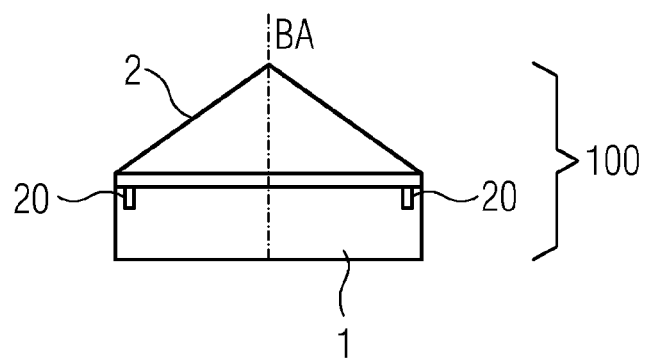
FIG. 6 indicates schematically a further process step of the presented method, wherein component is manufactured.

Said position features 10 as shown in the Figures may e.g. be provided at the same height or distance with respect to a buildup axis BA (cf. FIG. 2 and/or FIG. 6).

The position features 10 are advantageously provided in order to indicate or mark a defined manufacturing progress of the component 100 or the first section thereof. To this effect, the position features 10 may comprise reference features. The position features 10 may further constitute alignment features (cf. below).

Particularly, the position features and its positions may be designed along with the component 100 already during a computerized construction, e.g. within CAM and/or CAD datasets.

Then, within the presented method, it may be contemplated that a data setup, such as a CAD-data set, divides the component or its dataset into several sections, such as the first section 1 and the second section 2. Said partitioning into the sections shall be carried out based on the complexity and the susceptibility to build failures of the respective sections (cf. above). Further, said partitioning may be carried out automatically, e.g. machine-driven, or semi-automatically, e.g. with the aid or instruction of an operator, in that e.g. software implementation of the presented method.

In other words, when there is a known high-risk part of the build job, internal reference features may be placed or contemplated below the high-risk region.

A cavity 3 is indicated by the dashed lines in the design of the component in FIG. 1 to exemplify internal structures or channels which may be contemplated in the design of the second section 2 due to the respective functional requirement of the component 100. In case of a blade or vane of a turbine, said cavity 3 advantageously represents e.g. cooling channels of a corresponding airfoil in order to cool the structure of the second section 2 expediently during an operation of the component 100.

The indications in the FIGS. 2 to 6 advantageously indicate structural parts or sections of the component 100, in contrast to the indication of FIG. 1 indicating only its design.

FIG. 2 indicates schematically a first section 1. The first section 1 as shown has advantageously already been readily manufactured, e.g. by selective laser melting, wherein no build failure occurred e.g. due to the simple shape of the first section of the component 100. As explained above, the additive buildup of the first section 1 proceeds layerwise along a buildup axis indicated with numeral BA.

It is further shown in FIG. 2 that the first section 1 has been provided with the described position features 10, e.g. at each lateral side (cf. left and right) according to the design is shown in FIG. 1.

The second section 2 is advantageously directly and adhesively connected to the first section 1, advantageously in the same manufacturing process.

The incomplete contour or geometry of the component 100 in FIG. 2 indicates, that a build job failure or error occurred which what usually lead to waste of the whole component 100. Such failures may occur due to unexpected thermal expansion of single component sections, contaminated base material and/or simple adverse irregularities in the additive manufacture of the component 100.

Figure 3:
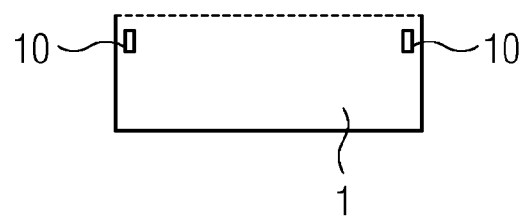
FIG. 3 indicates schematically a further process step of the presented method.

As shown in FIG. 3—in contrast to the indication of FIG. 2—the whole buildup or structure of the component 100 as shown in FIG. 2 has been machined back or abrasively removed (originating from the moment and manufacturing status in which the build error occurred) until the described position features 10 were revealed or became apparent.

Said position features 10 are advantageously constituted or implemented as recesses or small hollow spaces contemplated in the geometry of the first section, e.g. at close to an upper boundary of the first section as shown in FIGS. 2 and 3.

Figure 4:
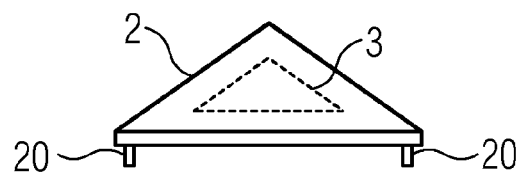
FIG. 4 indicates schematically a further process step of the presented method.
Figure 5:
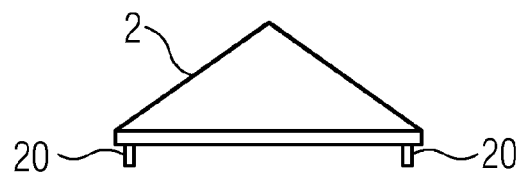
FIG. 5 indicates schematically a further process step of the presented method.

In order to avoid a complete waste of the additive buildup or as the case may be the first section thereof, the presented method further comprises separately and additively manufacturing the second section 2 for the component 100, e.g. in a separate manufacturing process, as shown in FIGS. 4 and 5.

FIG. 4 may indicate—instead of the physical structure of the second section 2—as well as a design for the second section 2 and the process step of (re)designing or changing the constructional data of or for the component 100 in that e.g. the CAM/CAD-dataset on which the design is based is varied or altered to the design of the second section 2 as shown in FIG. 4.

FIG. 5 may indicate the actual structural component based on the design as shown in FIG. 4.

According to the indication of FIG. 4, the second section is advantageously additively manufactured, possibly by the same manufacturing technique, as already used for the first section 1.

Thereby, the second section 2 is advantageously provided with corresponding position features 20, matching the position features of the first section. Particularly, the corresponding position features may comprise protrusions or any other engagement or locking features configured to abut or engage said recesses which constitute the position features 10 of the first section 1 (cf. FIG. 6 below).

Thus, the first section 1 and the second section 2 may be assembled and/or connected, wherein the corresponding position features 20 match or fit complimentarily and/or correspondingly to the position features 10.

Due to the mentioned match of the position features and the corresponding position features (cf. FIG. 6), the first section 1 may as well be aligned with respect to the second section 2 or vice versa, so that said sections may expediently be reliably and permanently connected (cf. below).

In other words, prior to the permanent connection of said sections, the position features 10 of the first section 1 and the corresponding position features 20 of the second section 2 may align and/or fix said sections 1, 2 with respect to each other by means of a form-fit, e.g. limiting mutual movement of the first section 1 and the second section 2 at least with respect to horizontal directions or axes (cf. according system with axis x and y in FIG. 1).

Further means may be necessary to reliably and permanently connect the first section with a second section or vice versa, e.g. by means of conventional techniques, such as welding, brazing or further joining techniques known to a skilled person, such as gluing or an assembly with bolts and/or a shrinkage connection.

In FIG. 6, the component 100 is advantageously shown in an assembled and/or a (adhesively) connected and as manufactured state. To this effect, the presented method may make use of additive manufacturing principles as well as conventional or known techniques.

Figure 7:
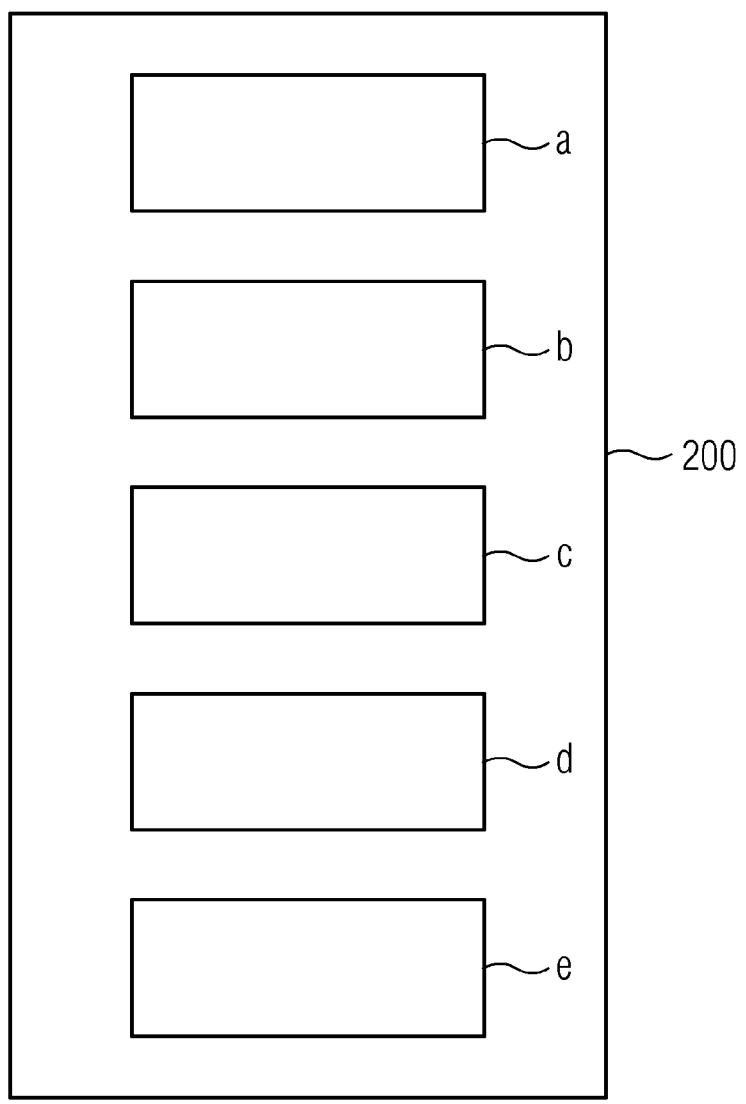
FIG. 7 indicates in a schematic flow chart at least some of the steps according to the presented method.

In FIG. 7, the presented method steps are expediently summarized in a schematic flow chart:

Numeral a) indicates additively manufacturing of the first section 1 for the component 100 as described above, wherein the first section 1 is provided with a position feature 10, as described above (cf. FIG. 2).

Numeral b) indicates additively manufacturing a second section 2 for the component 100 on the first section 1, as described above (cf. FIG. 2).

Only in case that a build failure occurs during the additive manufacture of the second section 2 (cf. incomplete geometry of the component 100 as shown in FIG. 2), the presented method comprises machining back the buildup or adhesively removing material from a present buildup until the position feature 10 is revealed, as described above (cf. FIG. 3).

Numeral c) in FIG. 7 further indicates that the presented method or single steps thereof may be implemented in a CAM, CAM and/or simulation software, which is set up to design and/or calculate the position feature(s) 10 and its position(s) with respect to the component 100, e.g. automatically or semi-automatically.

This may hold true within the scope of the present disclosure for the original design of the component 100 as well as for the updated separately or changed design of the second section 2 as depicted in FIG. 4, and as described above.

Numeral d) indicates additively manufacturing the second section 2 separately from the first section 1, thereby providing the second section 2 with a corresponding position feature 20, as described above.

Numeral e) indicates connecting the first section 1 and the second section 2 to provide or finalize the manufacture of the component 100, as described above.

The presented method may as well be carried out completely or only partly by a data processing device 200 (cf. FIG. 7). Said device 200 may be configured to execute at least some or all of the described method steps as program instructions.

It is of course contemplated within the scope of the present invention that the component to be manufactured may significantly vary from the exemplary embodiments, and the mentioned principles are nevertheless applicable.

The scope of protection of the invention is generally not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method of additive manufacturing comprising:
additively manufacturing a first section for a component, wherein the first section is provided with a position feature,
additively manufacturing a second section for the component on the first section, and, in case that a build failure occurs during the additive manufacture of the second section,
machining back a present buildup until the position feature is revealed, and
additively manufacturing the second section separately from the first section, thereby providing the second section with a corresponding position feature, and
connecting the first section and the second section to provide the component.

2. The method according to claim 1,
wherein the position feature and the corresponding position feature are configured to be engageable by a form-fit.

3. The method according to claim 1,
wherein the position feature comprises a recess.

4. The method according to claim 3,
wherein the corresponding position feature is an engagement or locking feature matching to the recess, such that the first section and the second section are engageable.

5. The method according to claim 1,
wherein the first section is an easy-to-build or low-risk section of the component with a low manufacturing complexity not being prone to build errors.

6. The method according to claim 1,
wherein the second section is a complex or high-risk section of the component being prone to build-up failure.

7. The method according to claim 6,
wherein the second section comprises cavities, channels, or other complex features.

8. The method according to claim 1,
wherein position feature and the corresponding position feature are designed and/or manufactured such that the first section and the second section are aligned with respect to each other for connecting the first section and the second section.

9. The method according to claim 1,
wherein the first section and the second section are finally adhesively connected with respect to each other.

10. The method according to claim 1,
wherein the first section comprises a base section for the component, and wherein a plurality of position features are provided at an upper boundary of the first section.

11. The method according to claim 1,
wherein a plurality of position features are provided at the same height of the first section measured in a direction along a buildup axis of the component.

12. The method according to claim 1,
wherein for each position feature of the first section, one corresponding position feature at the second section is provided.

13. The method according to claim 1,
wherein the first and/or the second section are additively manufactured by a powder bed manufacturing technique, selective laser melting or electron beam melting.

14. The method according to claim 1,
wherein the method is implemented in a CAD-, CAM- and/or simulation software, which is set up to automatically design and/or calculate the position feature and its position in or at the component.

15. A non-transitory computer readable medium comprising:
executable program instructions stored thereon which are adapted to instruct a data processing device to execute the following steps:
additively manufacturing a first section for a component, wherein the first section is provided with a position feature,
additively manufacturing a second section for the component on the first section, and, in case that a build failure occurs during the additive manufacture of the second section,
machining back a present buildup until the position feature is revealed, and
additively manufacturing the second section separately from the first section, thereby providing the second section with a corresponding position feature.

* * * * *